April 2, 1968  P. ODENTHAL  3,376,118

METALLIC COMPOSITE ARTICLE

Filed Jan. 5, 1965

PETER ODENTHAL, Inventor:

by Ernest F. Marmorek

Attorney

United States Patent Office 3,376,118
Patented Apr. 2, 1968

3,376,118
METALLIC COMPOSITE ARTICLE
Peter Odenthal, Dusseldorf, Germany, assignor to Mannesmann Aktiengesellschaft, Dusseldorf, Germany, a corporation of Germany
Filed Jan. 5, 1965, Ser. No. 423,426
2 Claims. (Cl. 29—183.5)

ABSTRACT OF THE DISCLOSURE

A metallic composite body has an outer section that includes an annular part and an inner longitudinal core filling a bore in the annular part. The bore has an elongated cylindrical portion, the cross sectional area of which is not more than one-third of that of the annular part, and has near one end a conical portion. The largest diameter of that conical portion, however, is smaller than the inner diameter of an internally plated article fabricated from the composite body by piercing or rolling.

---

It is known, in order to produce a seamless, externally plated hollow element made of metal, e.g. a tube, to start with a metal block composed of a hollow ingot and a core filling the bore in the said ingot, the hollow ingot being made of the plating material and the core of the support material. This composite metal block is pierced in the heated state and possibly processed further by being reduced e.g. in an extrusion press or a pilger type rolling mill. Piercing is carried out with a piercer the cross-section of which is smaller than the cross-section of the core of the composite block.

This process cannot be used for the production of internally plated hollow elements e.g. tubes. The starting workpieces generally used for the production of internally plated hollow elements are metal blocks composed of a cylinder of the support material and a hollow core of plating material. The internally plated hollow element is produced from this composite hollow block by a reducing process e.g. in an extrusion press or pilger type rolling mill, the bore of the core being used for accommodating the piercer required for reducing. The production of the hollow block used as the starting workpiece is involved and expensive, since the core made of plating material has to be pierced and must be securely fixed in the part of the block made of support material, which is generally effected by welding or flanging-over the ends of the hollow core.

It has been found that internally plated hollow elements e.g. tubes, can be produced from a block comprising say a hollow ingot of support material and a solid core of plating material with a much smaller outlay of time and financial expense by a process of rising hot piercing (and possibly subsequent reducing), if the cross-section of the core is made smaller than the annular cross-section of the hollow ingot of support material and if moreover the cross-section of the core is made smaller than the internal clear cross-section of the internally plated hollow element which is produced by the hot piercing process. During the penetration of the pierce into the composite metal block, the core material gradually flows over the edge of the piercer and is distributed in the form of a securely adhering uniform plating layer on the interior surface of the hollow element. The thickness of this plating layer is mainly dependent on the ratio of the cross-section of the core to the annular cross-section of the hollow ingot. Advantageous working conditions are obtained if the annular cross-section of the hollow ingot is at least three times as great as the cross-section of the core. It has also been found advantageous to provide the core at the head end with a conical thickening fitting into a widening of the hollow ingot bore.

Good results are obtained if the bore of the hollow block with the core arrangement therein, beginning from the head surface of the composite block, extends over only a part of the block height. Under some conditions, however, the hollow ingot bore with the core can also extend over the entire height of the block.

According to this invention a process for manufacturing an internally-plated, hollow, seamless article includes a rising hot piercing operation according to which a work piece, comprising a cored block of supporting material and a filling of plating material, the core being of substantially uniform cross-section, is pierced along the axis of the core by a piercing tool which has an effective cross-sectional area larger than that of the core, the said core area being smaller than the area of the cross-section of the surrounding supporting material taken in a direction normal to the core.

It has been found advantageous to weld a metal disc on to the base surface of the composite block. This base disc need not be pierced. Suitable measures can be taken to ensure that the base disc can be separated without difficulty from the composite block after the latter has been pierced. For example, the base disc can be connected to the block by a simple holding weld, and an intermediate layer can be arranged between the base disc and the block to prevent the base disc from being welded to the block during the piercing operation. By a suitable choice of the thickness for the base disc it is possible to obtain a "pointed" shape at the foot end of the internally plated hollow element produced from the composite block by piercing, and this is advantageous for the treatment of the hollow element in a pilger type mill.

Figure 1:
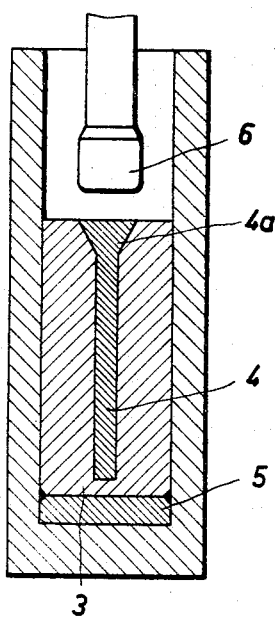
FIGURE 1 shows in axial sectional view the composite metal block arranged in a housing.

The metal block used as the preliminary workpiece is composed of a hollow ingot 3 of supporting material and a core 4 which fills the bore of the hollow ingot. The core 4 is provided at the head end with a conical thickening 4a which fills a corresponding widening in the hollow ingot bore. The cross-section of the core 4 is smaller than the cross-section of the piercer 6. The bore of the hollow ingot 3 with the core 4 extends over only part of the height of the block. Connected to the foot end of the hollow ingot is a disc 5 which can be made of a lower-quality material than the hollow ingot. The annular cross-section of the hollow ingot 3 is several times greater than the cross-section of the core 4.

Figure 2:
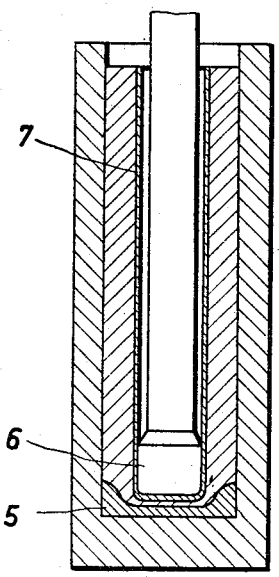
FIGURE 2 is an axial sectional view of the hollow element produced from the composite block by hot rising piercing.

When the composite ingot is pierced, the material of the core 4 flows about the edge of the piercer 6 and forms on the surface of the chamber produced by the piercer 6 a plating layer 7 which extends with uniform thickness over the entire height of the block. The base disc 5 is deformed in the manner shown in FIGURE 2, the base end of the hollow ingot 3 being given a tapering shape.

Example

For producing a tube from a soft carbon steel, (e.g. 0.10–0.15% C.) to a size of 220 mm. diameter with 18 mm. wall thickness, which is to be plated internally with a layer 2 mm. in thickness of a high-alloyed steel (e.g. with a ferritic 13% Cr steel or an austenitic steel of VA 18/8 type,) for example the preliminary workpiece used is a cylindrical or slightly conical ingot having a diameter of 290 mm. and a length of 700 mm. This ingot is provided with a concentric bore which starts from the head surface and has a length of 700 mm. and a diameter of 92 mm. Fitting exactly into this bore is a core of the high-alloyed steel, such that the bore is completely filled. The core can be widened in funnel-like manner at the head end over a length of 150 mm. to a diameter of 195 mm. On the base surface of the ingot surface there is fixed by means of a circular seam a disc which is 290 mm. in diameter and about 60 mm. in thickness. This disc can be made of any desired low-quality material.

A preliminary workpiece produced in this way is heated to press temperature and is subjected to a rising piercing operation with a piercer of 185 mm. in diameter, producing a hollow block with an external diameter of 290 mm., an internal diameter of 185 mm. and a length of about 1,200 mm. The non-pierced foot disc conveniently remains on the block and is drilled to the size of the hole in the block and replaces the so-called hot ring when the tube is being processed on a pilger type rolling mill. The thickness of the plating layer produced at the inside of the hollow block at the hot piercing operation amounts to 6.5 mm. This hollow block is reduced on the pilger mill to a tube of 220 mm. external diameter and 20 mm. wall thickness. The plating layer at the inside of the tube then has a layer thickness of 2 mm.

I claim:
1. A metallic composite body, for use in the fabrication therefrom by piercing or rolling of an internally plated seamless article, comprising an outer section including an annular part defining a longitudinal bore open at least at one end, said bore including an elongated cylindrical portion and an outward flaring conical portion terminating near said one end, and an inner section comprising a core filling both portions of said bore, the annular cross sectional area of said part being at least three times as large as the cross sectional area of said cylindrical portion, the largest diameter of said conical portion prior to said fabrication being larger than the inner diameter of said internally plated article after the fabrication.

2. A metallic composite body, as claimed in claim 1, said outer section including a bottom part closing the other end of said bore, and a metal disc connected to said bottom part oppositely relative to said closed end of said bore.

References Cited

UNITED STATES PATENTS

| | | | |
|---|---|---|---|
| 860,232 | 7/1907 | Offutt | 29—474.3 |
| 1,321,096 | 11/1919 | Gear | 72—266 |
| 1,948,242 | 2/1934 | Schobart. | |
| 2,107,943 | 2/1938 | Hopkins. | |
| 2,133,291 | 10/1938 | Gordon. | |
| 2,908,073 | 10/1959 | Dulin | 29—497.3 X |
| 3,098,022 | 7/1963 | Karnie | 29—473.3 |

JOHN F. CAMPBELL, *Primary Examiner.*

J. L. CLINE, *Assistant Examiner.*